United States Patent
Bradley et al.

(10) Patent No.: US 6,687,417 B1
(45) Date of Patent: Feb. 3, 2004

(54) MODIFIED KERNEL FOR IMAGE INTERPOLATION

(75) Inventors: Andrew Peter Bradley, New South Wales (AU); Kai Huang, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/454,964

(22) Filed: Dec. 6, 1999

(30) Foreign Application Priority Data

Dec. 18, 1998 (AU) ................................. PP7797

(51) Int. Cl.⁷ .................. G06K 9/64; G06K 9/32; G09G 5/00
(52) U.S. Cl. .................. 382/279; 382/300; 345/615
(58) Field of Search ................... 382/279, 298, 382/268, 269, 300; 345/615

(56) References Cited

U.S. PATENT DOCUMENTS

| | | | |
|---|---|---|---|
| 4,829,587 A | * 5/1989 | Glazer et al. | 382/299 |
| 5,070,403 A | * 12/1991 | Wilkinson | 375/240.14 |
| 5,168,375 A | * 12/1992 | Reisch et al. | 382/250 |
| 5,237,524 A | * 8/1993 | Heinemann | 708/322 |
| 5,294,984 A | * 3/1994 | Mori et al. | 348/720 |
| 5,446,804 A | * 8/1995 | Allebach et al. | 382/298 |
| 5,537,226 A | * 7/1996 | Wolberg et al. | 358/486 |
| 5,615,287 A | * 3/1997 | Fu et al. | 382/232 |
| 5,774,601 A | * 6/1998 | Mahmoodi | 382/298 |
| 5,859,712 A | * 1/1999 | Kim | 358/504 |
| 5,949,916 A | * 9/1999 | Chun | 382/261 |
| 6,222,173 B1 | * 4/2001 | Meeussen et al. | 250/208.1 |
| 6,546,157 B1 | * 4/2003 | Okuno et al. | 382/300 |
| 2001/0043760 A1 | * 11/2001 | Hieda et al. | 382/300 |

OTHER PUBLICATIONS

U.S. patent application Ser. No. 09/466,177, filed Dec. 17, 1999.

U.S. patent application Ser. No. 09/466,178, filed Dec. 17, 1999.

* cited by examiner

Primary Examiner—Amelia M. Au
Assistant Examiner—Ryan J. Hesseltine
(74) Attorney, Agent, or Firm—Fitzpatrick, Cella, Harper & Scinto

(57) ABSTRACT

A method of providing a representation of image data is disclosed. The method accesses a plurality of discrete sample values of the image data and calculates kernel values for each of the discrete sample values using a scaled kernel. The scaled kernel is constructed by transforming a kernel from a first range to a second range. In order to provide a representation of the image data, the kernel values are convolved with the discrete sample values.

108 Claims, 14 Drawing Sheets

MODIFIED KERNEL FOR IMAGE INTERPOLATION

FIELD OF INVENTION

The present invention relates to a method of resolution conversion of digital data and in particular digital image and video data. The invention also relates to a computer program product including a computer readable medium having recorded thereon a computer program for resolution conversion of digital data.

BACKGROUND OF INVENTION

A filter function used in digital data resolution conversion is often called a convolution kernel, a filter kernel or just a kernel. When a kernel produces data that passes through original data points of a sampled signal, it is often called an interpolating kernel and when the interpolated data produced is not constrained to pass through the original data points it is often called an approximating kernel.

Prior art kernels for digital data resolution conversion include the nearest neighbour (NN), linear, quadratic and cubic kernels. Coefficient value versus pixel plots of these kernels are shown in FIGS. 1 to 4 respectively. The NN kernel is the simplest method of interpolation, simply interpolating the image with the pixel value that is spatially nearest to the required pixel value. This method works quite well when the scaling ratio is an integer multiple of the original data as it introduces no new values, ie. no new colours, and preserves sharp edges. However, at other ratios the NN kernel has the disadvantage of shifting edge locations which often produces visible distortions in the output image, especially in images containing text or fine line details. Linear interpolation on the other hand allows for the introduction of new grey levels (or colours) that are effectively used to position edges at sub-pixel locations. This has the advantage of reducing the effect of shifted edge locations, however sharp edges can now appear to be blurred. Quadratic and cubic interpolation provide steeper step responses and therefore less edge blurring, however, the steeper response results in an overshoot on either side of the edge. These overshoots can make the edges in natural images appear sharper, but on text, fine lines, or on other computer generated graphics these overshoots are clearly visible and detract from the perceived image quality and text legibility. Step responses of these four kernels are shown in FIGS. 5 to 8.

A digital data resolution conversion method is known in which the parameters of a cubic kernel are adjusted so as to remove the overshoot in a step response using a two parameter Catmul-Rom cubic that has a kernel h(s) of the form:

$$h(s) = \begin{cases} \left(2 - \frac{3}{2}b - c\right)|s|^3 + (-3 + 2b + c)|s|^2 + \left(1 - \frac{1}{3}b\right), & |s| \leq 1 \\ \left(\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases} \quad (1)$$

where s=t/Δt, the parameter b is fixed at b=0, whilst c is varied between 0, 0.5, and 1 dependent upon the edge strength (ie: the sharpness of the edge) measured using a Laplacian of Gaussian (LOG) edge detector. At a sharp edge c=0 and the resulting cubic is:

$$h(s) = \begin{cases} 2|s|^3 - 3|s|^2 + 1, & |s| \leq 1 \\ 0, & \text{Otherwise} \end{cases} \quad (2)$$

There is however, a problem with using this kernel to interpolate image data when the resampled pixel displacement is not significantly different from the original pixel displacement, say a re-sampling ratio of 10/11 or 11/10. In this case, pixels at the edges of text and other fine lines take on a grey value rather than the original black or white image values. This again results in a perceived blurring of sharp edges and a reduction in the observed image quality.

It is an object of the present invention to ameliorate one or more disadvantages of the prior art.

SUMMARY OF THE INVENTION

According to one aspect of the invention there is provided a method of providing a representation of image data, the method comprising the following steps:

(i) accessing a plurality of discrete sample values of said image data;

(ii) calculating kernel values for each of said discrete sample values using a scaled kernel, wherein said scaled kernel is constructed by transforming a kernel from a first range to a second range, and wherein said second range is less than said first range, wherein kernel values can be calculated over the said entire first range; and (iii) convolving said kernel values with said discrete sample values to provide a representation of said image data.

According to another aspect of the invention there is provided an apparatus for providing a representation of image data, the apparatus comprising:

accessing means for accessing a plurality of discrete sample values of said image data;

calculating means for calculating kernel values for each of said discrete sample values using a scaled kernel, wherein said scaled kernel is constructed by transforming a kernel from a first range to a second range, and wherein said second range is less than said first range, wherein kernel values can be calculated over the said entire first range; and convolving means for convolving said kernel values with said discrete sample values to provide a representation of said image data.

According to a still further aspect of the present invention there is provided a computer readable medium for storing a program for an apparatus which processes data, said processing comprising a method of providing a representation of image data, said program comprising:

code for accessing a plurality of discrete sample values of said image data;

code for calculating kernel values for each of said discrete sample values using a scaled kernel, wherein said scaled kernel is constructed by transforming a kernel from a first range to a second range, and wherein said second range is less than said first range, wherein kernel values can be calculated over the said entire first range; and code for convolving said kernel values with said discrete sample values to provide a representation of said image data.

According to a still further aspect of the present invention there is provided a method of representing image data, the method comprising the following steps:

(i) accessing a plurality of discrete sample values of said image data;
(ii) calculating kernel values for each of said discrete sample values using a scaled kernel, wherein said scaled kernel is of the form:

$$h(s) = \begin{cases} 1 - d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein s=t/Δt and 0≤d<0.5; and
(iii) convolving said kernel values with said discrete sample values to provide a representation of said image data.

According to a still further aspect of the present invention there is provided an apparatus for representing image data, the apparatus comprising:
accessing means for accessing a plurality of discrete sample values of said image data;
calculating means for calculating kernel values for each of said discrete sample values using a scaled kernel, wherein said scaled kernel is of the form:

$$h(s) = \begin{cases} 1 - d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein s=t/Δt and 0≤d<0.5; and
convolving means for convolving said kernel values with said discrete sample values to provide a representation of said image data.

According to a still further aspect of the present invention there is provided a computer readable medium for storing a program for an apparatus which processes data, said processing comprising a method of representing image data, said program comprising:
code for accessing a plurality of discrete sample values of said image data;
code for calculating kernel values for each of said discrete sample values using a scaled kernel, wherein said scaled kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

otherwise and wherein s=t/Δt and 0≤d<0.5; and
code for convolving said kernel values with said discrete sample values to provide a representation of said image data.

According to a still further aspect of the present invention there is provided a method of transforming a kernel for image processing the method comprising the following steps:
(i) accessing a kernel for image processing;
(ii) transforming said kernel from a first range to a second range, wherein said second range is less than said first range; and
(iii) storing said transformed kernel.

According to a still further aspect of the present invention there is provided an apparatus for transforming a kernel for image processing, said apparatus comprising:
accessing means for accessing a kernel for image processing;
transforming means for transforming said kernel from a first range to a second range, wherein said second range is less than said first range; and
storing means for storing said transformed kernel.

According to a still further aspect of the present invention there is provided a computer readable medium for storing a program for an apparatus which processes data, said processing comprising a method of transforming a kernel for image processing, said program comprising:
code for accessing a kernel for image processing;
code for transforming said kernel from a first range to a second range, wherein said second range is less than said first range; and
code for storing said transformed kernel.

According to a still further aspect of the present invention there is provided a method of converting a first set of discrete data sample values of an image having a first sample rate to a second set of discrete data sample values of said image having a second sample rate, the method comprising the following steps:
(i) accessing said first set of data sample values; and
(ii) performing the following operations for each data value of said second set;
  (a) calculating kernel values for each of said discrete sample values of said first set, according to a first kernel, wherein said first kernel is constructed from a scaled version of a second kernel; and
  (b) convolving said kernel values with said discrete sample values of said first data set to provide a current data value of said second set.

According to a still further aspect of the present invention there is provided an apparatus for converting a first set of discrete data sample values of an image having a first sample rate to a second set of discrete data sample values of said image having a second sample rate, the apparatus comprising:
access means for accessing said first set of data sample values; and
processing means for performing the following operations for each data value of said second set;
  (a) calculating kernel values for each of said discrete sample values of said first set, according to a first kernel, wherein said first kernel is constructed from a scaled version of a second kernel; and
  (b) convolving said kernel values with said discrete sample values of said first data set to provide a current data value of said second set.

According to a still further aspect of the present invention there is provided a computer readable medium for storing a program for an apparatus which processes data, said processing comprising a method of converting a first set of discrete data sample values of an image having a first sample rate to a second set of discrete data sample values of said image having a second sample rate, said program comprising:
code for accessing said first set of data sample values; and
code for performing the following operations for each data value of said second set;
  (a) calculating kernel values for each of said discrete sample values of said first set, according to a first kernel, wherein said first kernel is constructed from a scaled version of a second kernel; and (b) convolving said kernel values with said discrete sample values of said first data set to provide a current data value of said second set.

BRIEF DESCRIPTION OF THE DRAWINGS

Embodiments of the invention are described with reference to the drawings, in which.

DETAILED DESCRIPTION

Figure 1:
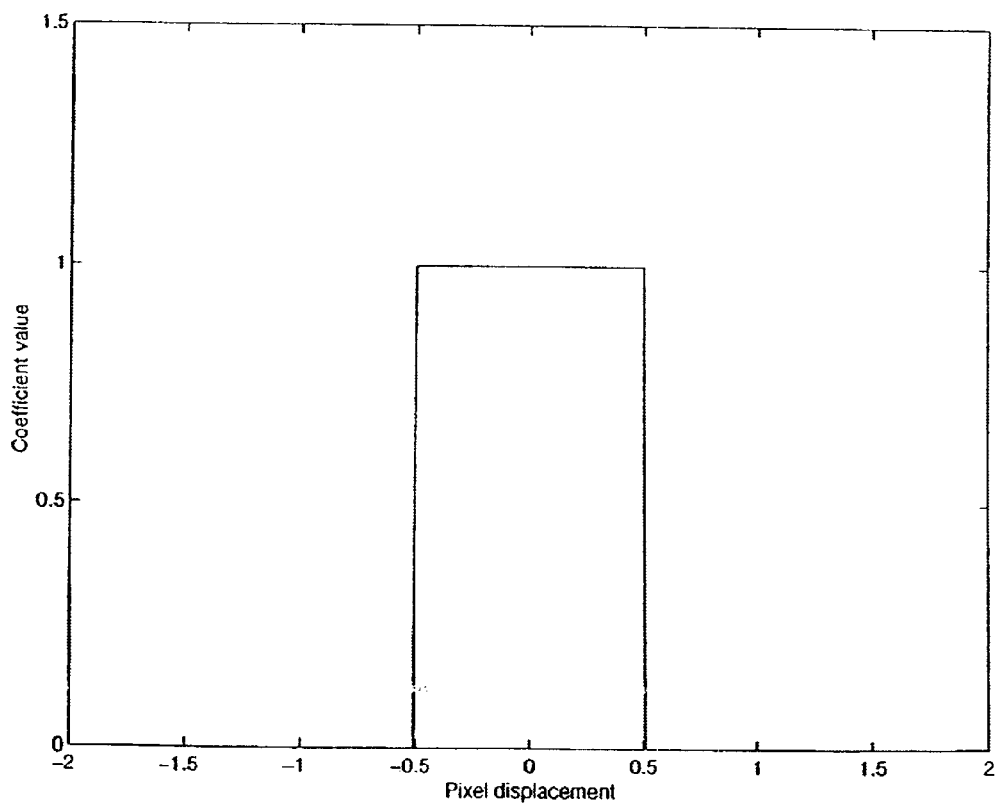
FIG. 1 shows a coefficient value versus pixel plot for a nearest neighbour kernel.
Figure 2:
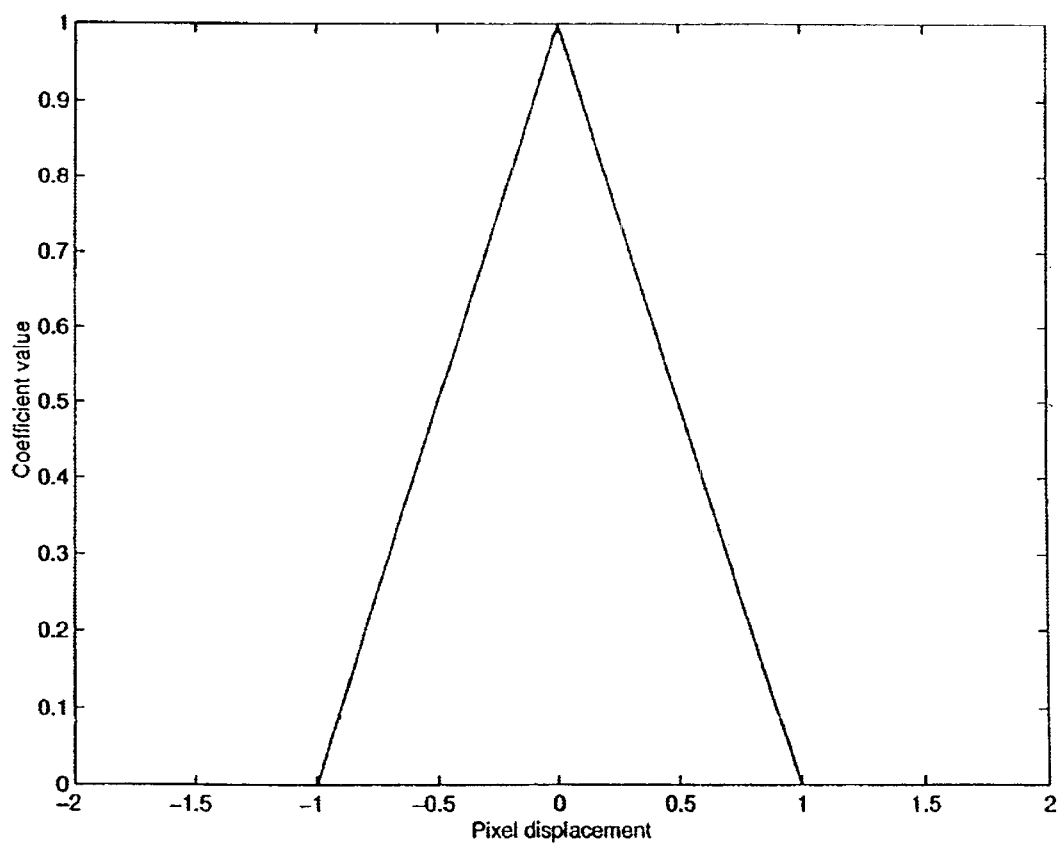
FIG. 2 shows a coefficient value versus pixel plot for a linear kernel.
Figure 3:
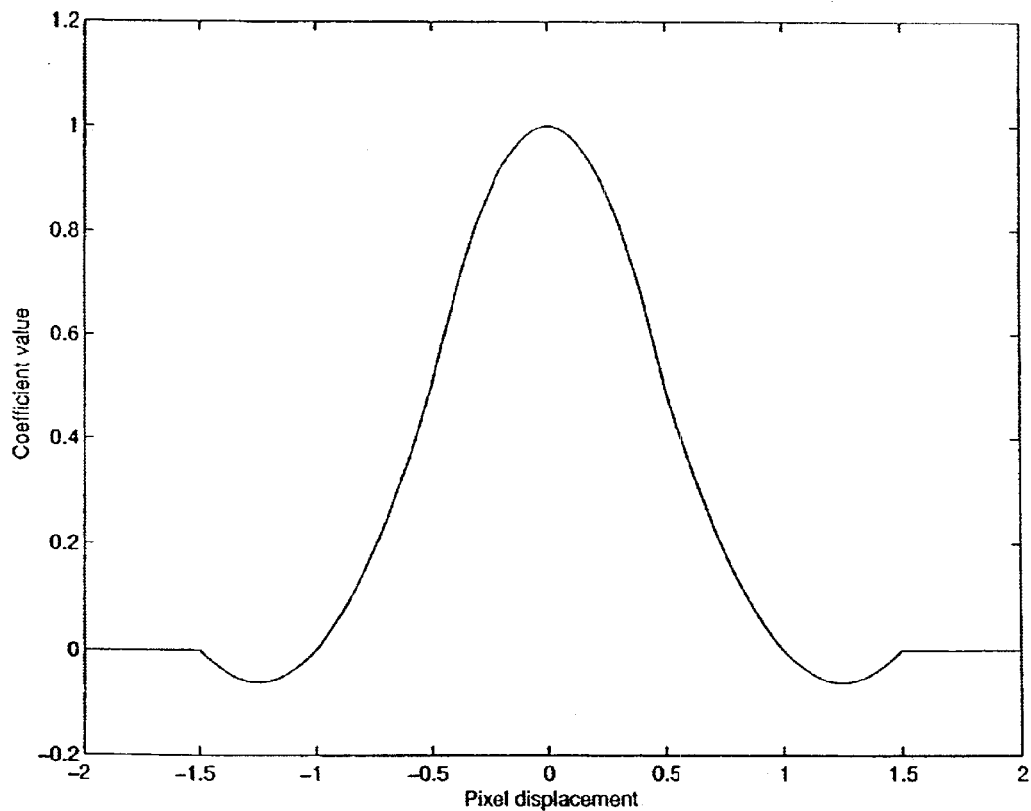
FIG. 3 shows a coefficient value versus pixel plot for a quadratic kernel.
Figure 4:
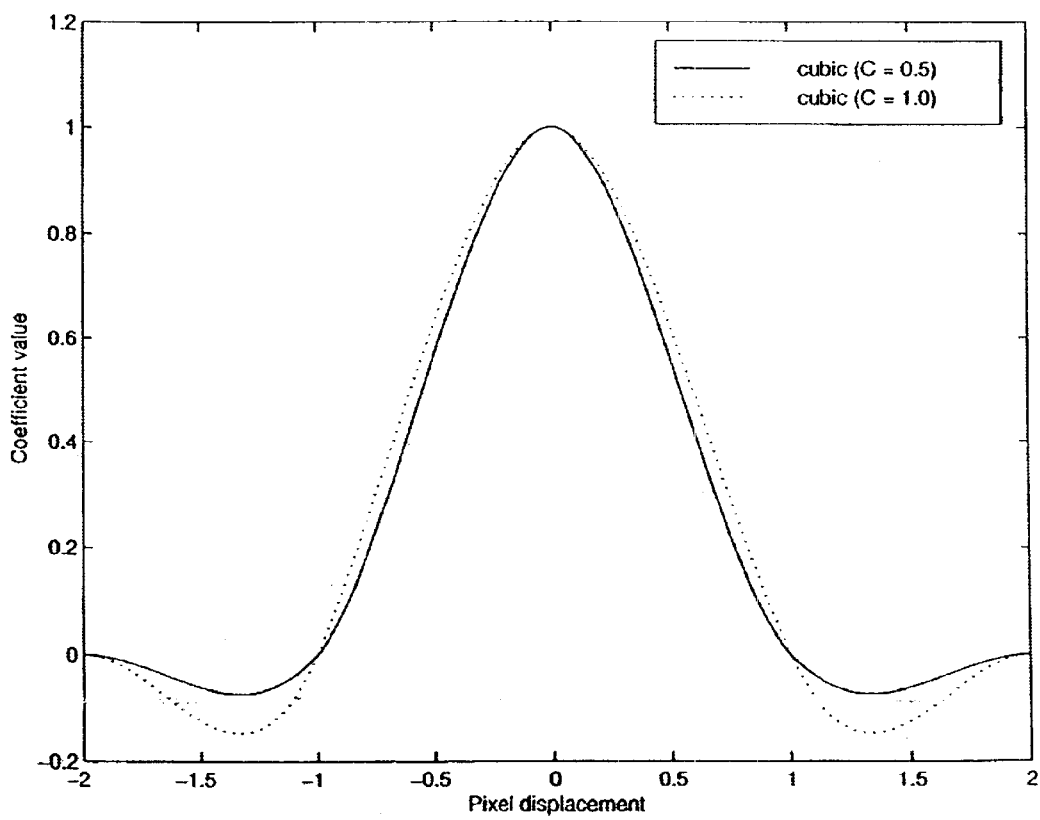
FIG. 4 shows a coefficient value versus pixel plot for a cubic kernel.
Figure 5:
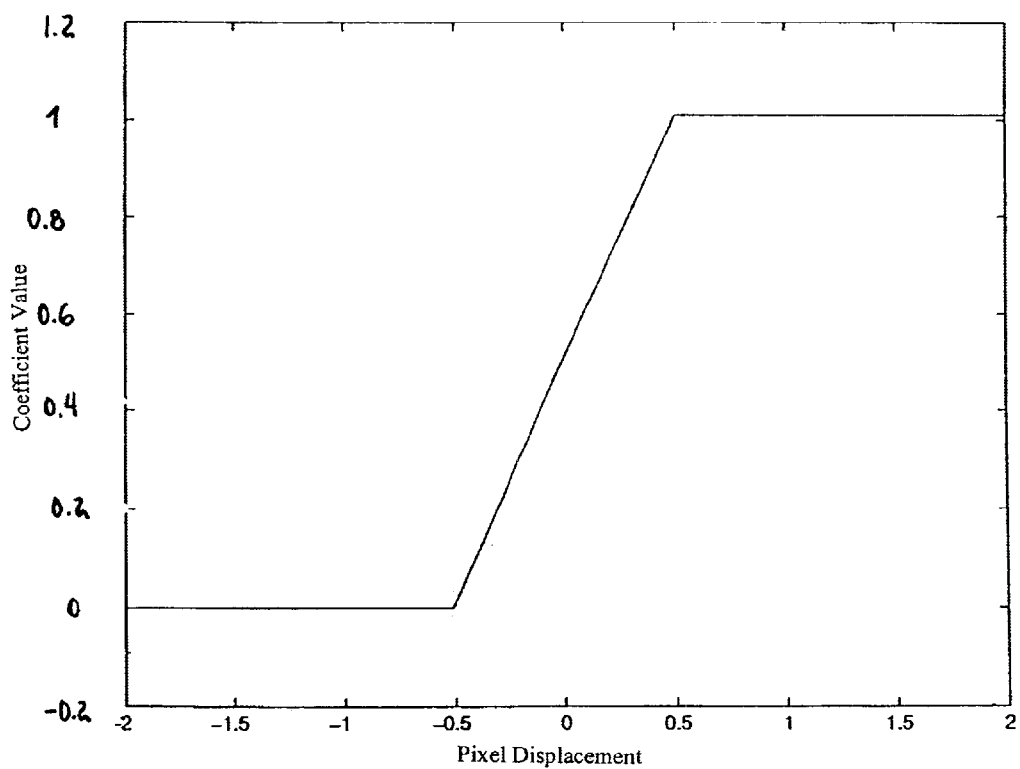
FIG. 5 shows a step response for a nearest neighbour kernel.
Figure 6:
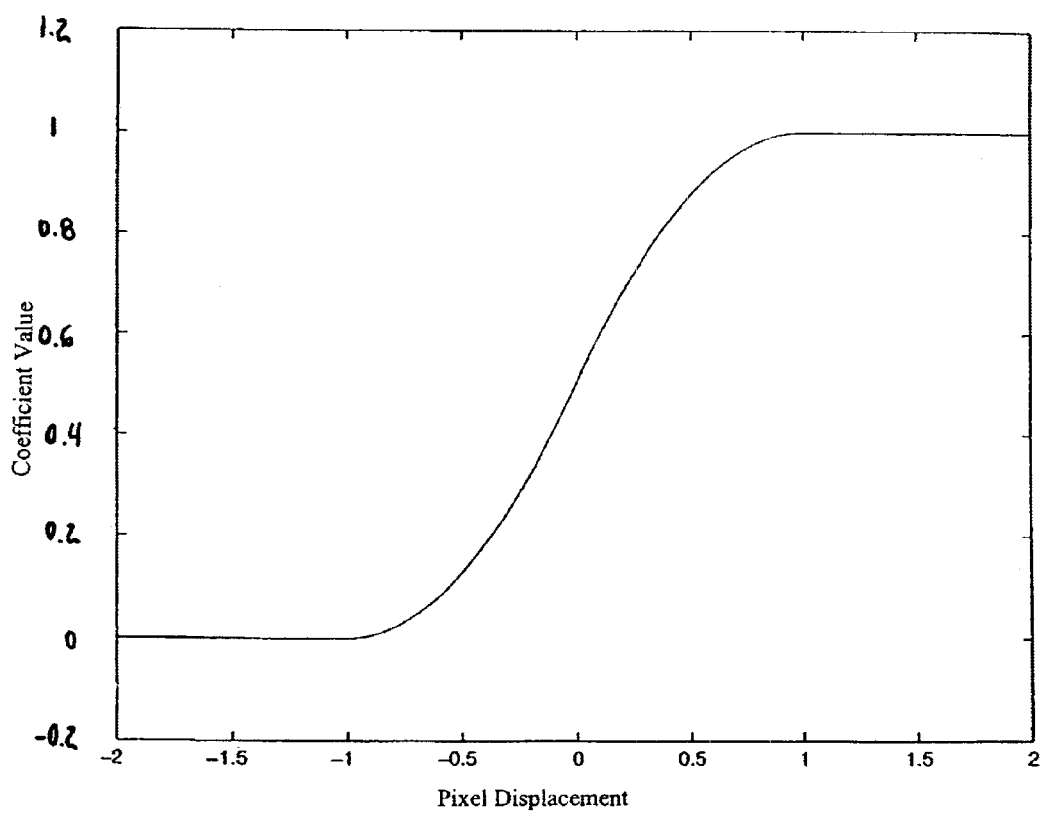
FIG. 6 shows a step response for a linear kernel.
Figure 7:
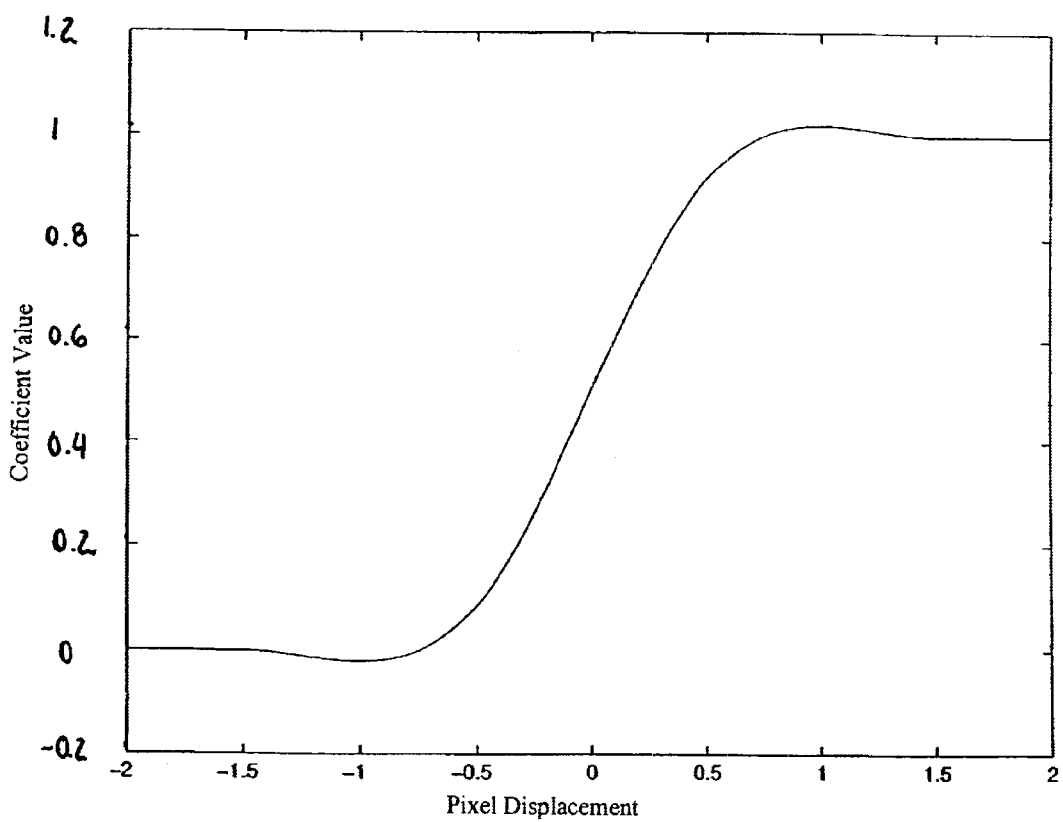
FIG. 7 shows a step response for a quadratic kernel.
Figure 8:
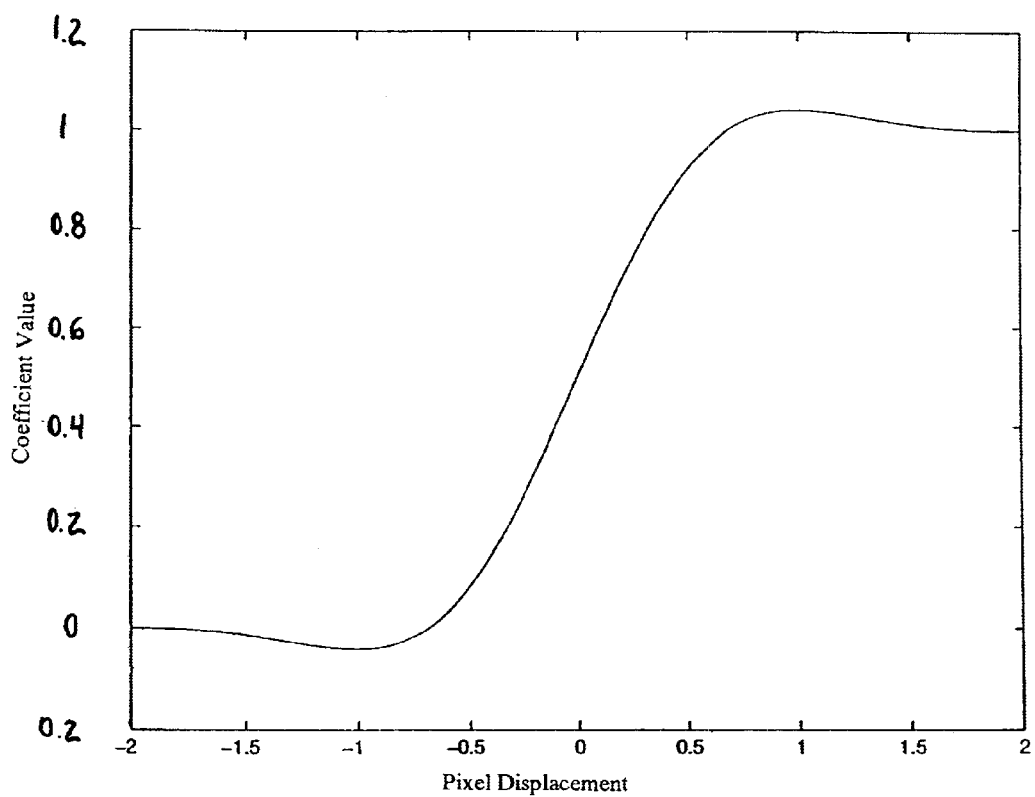
FIG. 8 shows a step response for a cubic kernel.

Where reference is made in any one or more of the drawings to steps and/or features, which have the same reference numerals, those steps and/or features are for the purposes of the description the same, unless the contrary appears.

Figure 9:
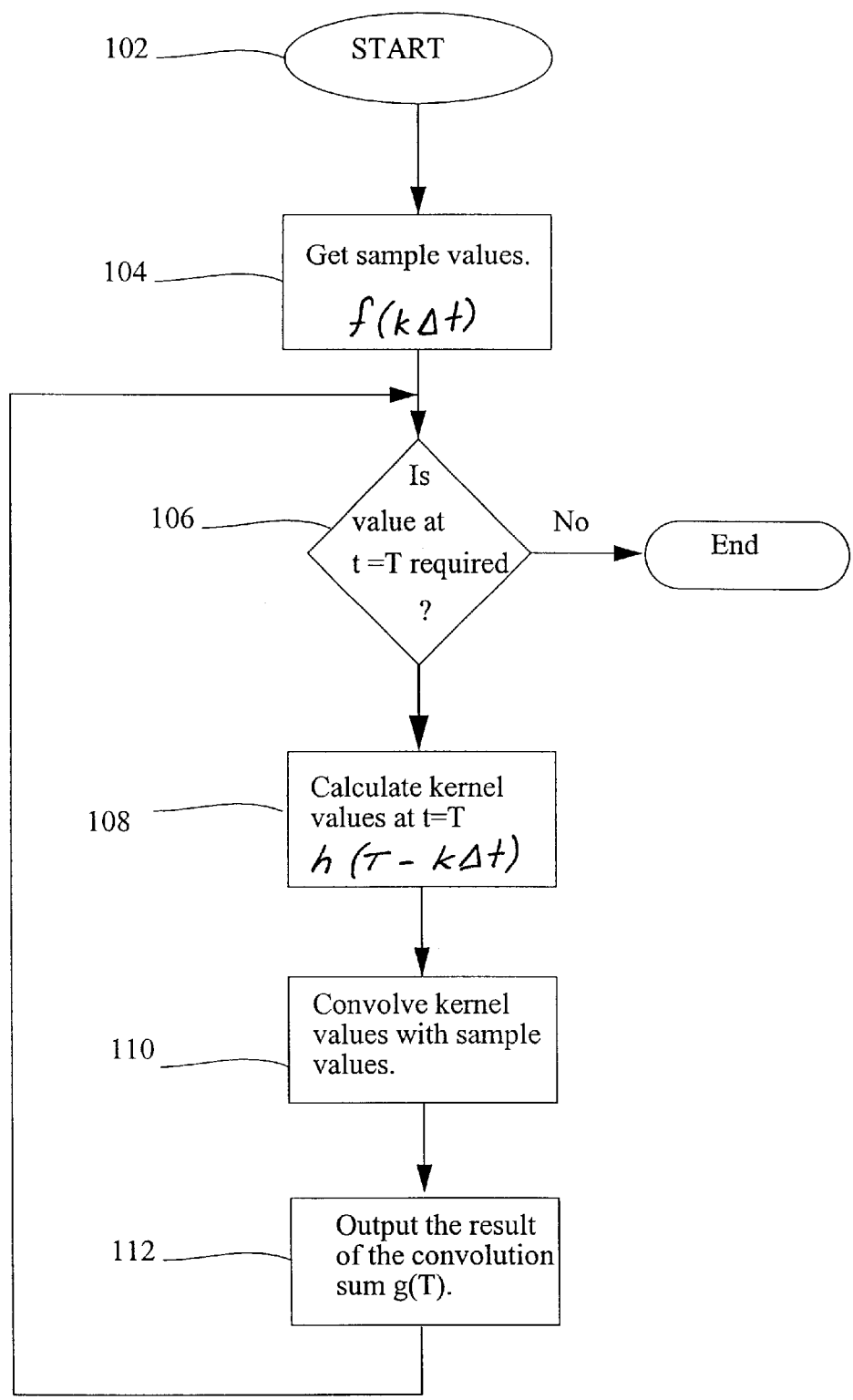
FIG. 9 is a flow diagram of a method of interpolating digital data in accordance with a preferred embodiment of the present invention.

FIG. 9 is a flow diagram of a method of resampling image data in accordance with a preferred embodiment of the invention. The preferred method maintains the appearance of sharp lines and text at arbitrary re-sampling ratios. The method commences at step 102 where any necessary processes and parameters are initialised, such as counters. At the next step 104, sample values in the form f(kΔt) (k=−n . . . −2, −1, 0, 1, 2, . . . n), where Δt is the (constant) sampling rate, are retrieved for processing. The process continues at decision block 106, where a check is carried out to find out if the final sample value, at t=T, has been calculated. If the final sample value has been calculated then the process will end. Otherwise, at the next step 108, kernel values h(T−kΔt) are calculated in accordance with the kernel of the preferred embodiment, h(s), given by:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases} \quad (3)$$

otherwise where s=t/Δt is a normalised coordinate that has integer values at the sample points. In the preferred embodiment, the kernel parameter d has a default value of 0.2. Alternatively, the user can select a desired value for d. Varying d allows the user to trade off edge sharpness with edge translation effects. In the next step 110, the sample values, f(kΔt), are convolved with the kernel values h(T−kΔt), according to the finite convolution sum:

$$g(T) = \Sigma f(k\Delta t) h(T - k\Delta t),$$

at t=T. The process continues at step 112 where the result of the convolution sum, g(T), is output. The process will continue until the final sample value has been calculated.

The following paragraphs provide a more detailed explanation of the kernel according to the preferred embodiment.

Interpolation with a continuous kernel effectively gives a continuous function g(t), that is an approximation of f(t), and is given by the finite convolution sum:

$$g(t) = \Sigma f(k\Delta t) h(t - k\Delta t).$$

The kernels are, by definition, of finite support and symmetrical about s=0. The kernel of the preferred embodiment is a modified cubic kernel and can be shown to be an interpolating kernel, where the interpolated function passes through the sample points of the original function, as h(0)=1, while h(kΔt)=0 for k≠0 which ensure that g(kΔt)=f(kΔt). From Equation (4) any sample of g(t) can be calculated using the continuous kernel, h(t), and a finite number of original sample points, f(kΔt), adjacent to the sample being interpolated. For example, the conventional cubic kernel, defined by equation (1), requires the four adjacent sample points while the modified cubic kernel, defined by Equation (3), requires only two.

The modified cubic kernel is what is known as a separable kernel. This means that the kernel can be applied to the image data in one of two equivalent ways:

(i) applying the convolution kernel to the rows of the image and then using these interpolated values to interpolate along the columns of the image (or vice-versa). For example, the conventional cubic kernel has four coefficients and requires the four nearest samples for both the rows and the columns. The modified cubic however, has only two coefficients and requires only the two nearest samples. This technique however, has the disadvantage of requiring intermediate storage of interpolated values, which can make it not suitable for a hardware implementation for example.

(ii) A 2-dimensional kernel can be generated and then convolved directly with the image data. The 2-dimensional kernel is generated using matrix multiplication of the coefficient values calculated for the rows and the columns separately. For example, the conventional cubic kernel has 16 (4×4) coefficients while the modified cubic has only four, (2×2). These 2-dimensional blocks of coefficients are then convolved directly with the same size block of nearest neighbour image samples around the pixel being interpolated. This method has the advantage of not requiring any intermediate storage, but does require more multiplication operations.

Figure 10:
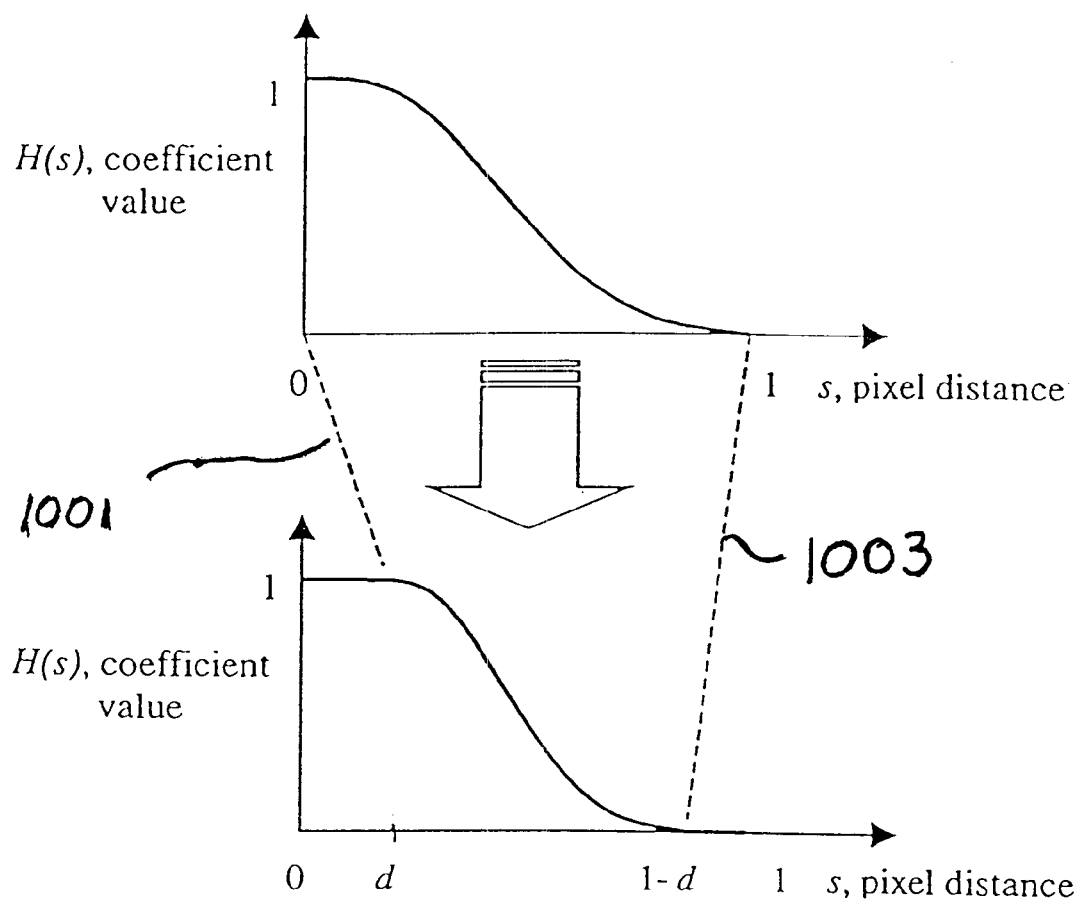
FIG. 10 shows a linear transform, of the cubic interpolation kernel of FIG. 4, from the range s=[0,1] to the range s'=[d, 1−d]
Figure 13:
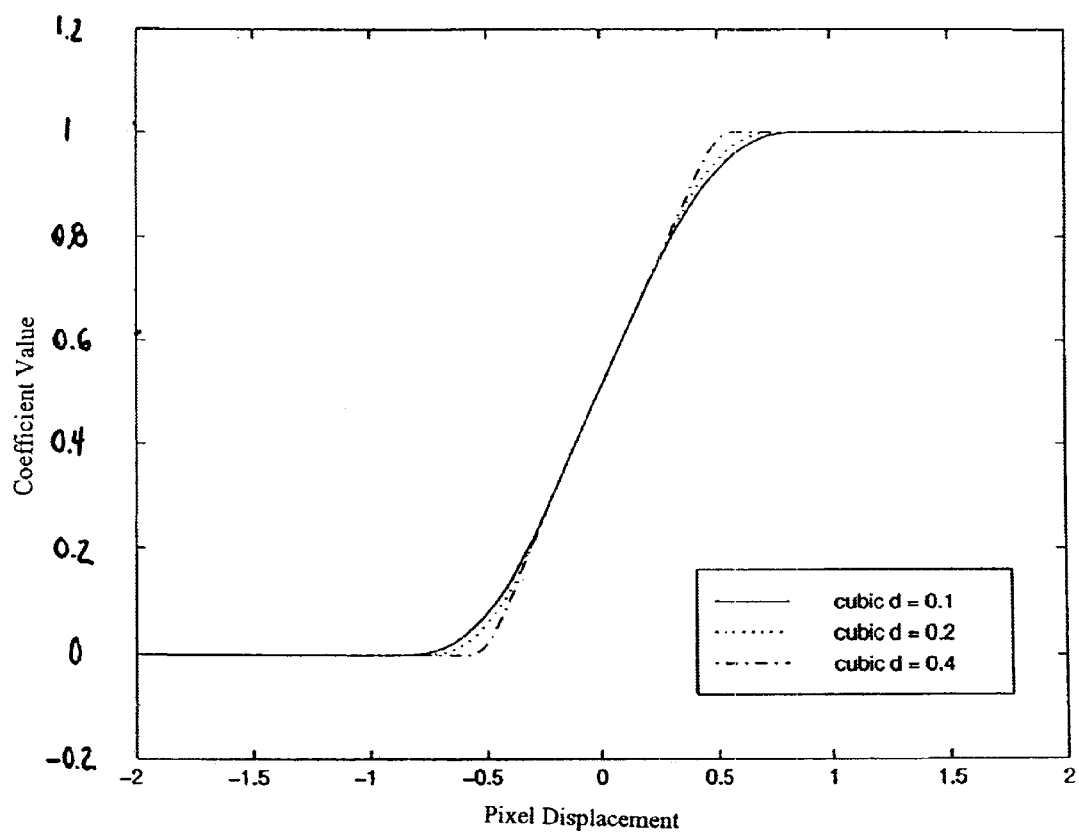
FIG. 13 shows the step response of a modified cubic kernel with various values of d in accordance with the present invention.

The preferred method of generating the modified cubic interpolation kernel is to linearly transform the cubic interpolation kernel defined in Equation (2) from the range s=[0,1] to the range s'=[d, 1−d], as shown in FIG. 10. This involves making the substitution s'=(s−d)/1−2d) so that the point s=d becomes s'=0 and the s=(1−d) becomes s'=1. In this way, the original cubic is effectively compressed into the reduced range [d, 1−d]. This effectively creates a symmetrical "dead-zone" at both the lower and upper ends of the kernel as illustrated in FIG. 10. When d=0, the function reduces to a conventional cubic kernel (with b=0, c=0) and when d=0.5, the NN kernel results. As explained above, varying d allows the user to trade off edge sharpness with edge translation effects and gain the benefits of both the NN and cubic convolution whilst minimising their disadvantages. The modified cubic kernel is shown with various values of d in FIG. 11. In the preferred embodiment a constant value of d=0.2 is used, however the scope of the preferred embodiment covers methods that vary d depending on re-sampling ratio or edge proximity. FIG. 13 demonstrates the effect of varying d on the step response of the modified cubic kernel. For example, increasing d increases the slope of the step response and therefore increases the perceived edge sharpness.

The method is also particularly advantageous for interpolating image sequences, for example when changing the frame (or field) rate of a video sequence. This is because it only requires the two nearest frames to interpolate any intermediate frame, which minimises frame storage. In addition, the separable nature of the kernel means that the kernel can be applied along the rows, columns, and along the temporal domain in turn or alternatively a 3-dimensional kernel can be constructed and convolved the 3-dimensional video data. Various combinations of the above two schemes, which trade off memory storage and computational complexity, are also possible.

In another embodiment of the present invention the modified cubic kernel is adapted according to the temporal differences in a sequence of images, or video. At each pixel in the image sequence, I(x,y,t), the temporal difference δ with the previous frame is calculated as follows:

$$\delta = |I(x,y,t) - I(x,y,t-1)| \quad (5)$$

Figure 14:
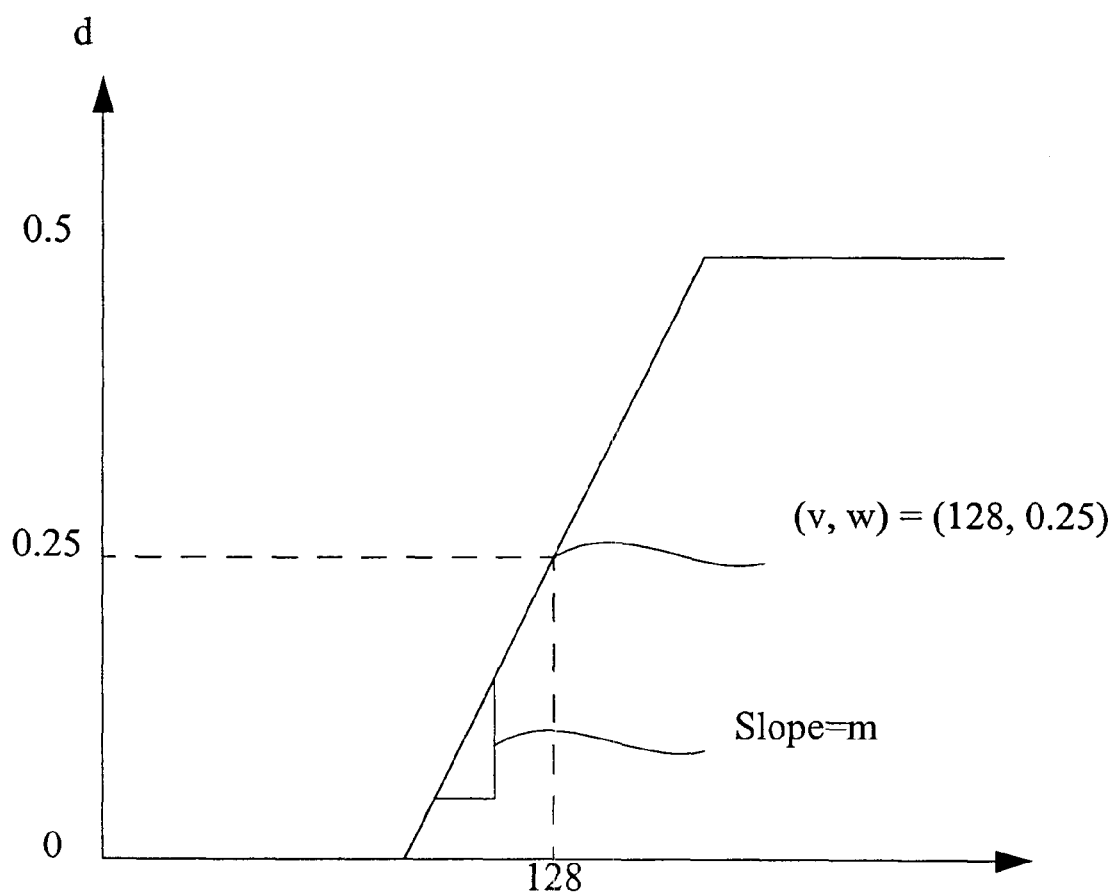
FIG. 14 shows a graph of the dead-zone parameter d, for varying values of temporal difference, in accordance with the preferred embodiment of the present invention.

This is then used to adapt the dead-zone parameter, d, according to $$d = \min\left(0.5, \max\left(0, \frac{(\delta - v)}{m} + w\right)\right), \quad (6)$$

where m is the slope parameter, where m>0, and (v,w) are the coordinates of a point the function is constrained to pass through. Preferably, (v,w) are set to be (128, 0.25), and a slope parameter of m=320 is used, as illustrated in FIG. 14. In this way, when the temporal difference between pixels is small the conventional cubic kernel is used, whilst when temporal differences are large the nearest neighbor kernel is (effectively) used. The method then adapts the kernel shape with a gradual transition between the cubic and NN kernels at moderate temporal differences. This adaptation reduces the effects of motion blur in video sequences that contain a large amount of motion.

The preferred embodiment is based on a modification of the cubic kernel defined in Equation (2). It is realised that the technique disclosed can be applied to any continuous kernel, such as the linear, quadratic, or weighted sinc kernels. However, the linear, quadratic, and sinc kernels have fewer degrees of freedom than the cubic kernel and this results in a discontinuity, ie. a non-smooth transition, where the dead-zone joins the (transformed) original kernel. This discontinuity will therefore cause a discontinuity in the interpolated image data, which can not be desirable. However, the modified linear and quadratic kernels will have an advantage in terms of a simplified implementation and reduced computational complexity. The modified linear kernel, h(s), is given by:

$$h(s) \begin{cases} 1 & -d < s \le d \\ 0, & -(1-d) \ge s > 1-d \\ 1 - \frac{|s-d|}{1-2d}, & \text{elsewhere} \end{cases} \quad (7)$$

where s=t/Δt is a normalised coordinate that has integer values at the sample points.

The method can also be applied to colour images and video sequences. For colour images the kernel can be applied to each of the colour planes independently, such as say RGB, YUV, YCbCr etc. If the modified cubic kernel is used adaptively on sharp image edges only, the kernel can be applied to all three colour planes when an edge is detected in any one of the colour planes, i.e., edge strength is calculated as the maximum of the edge strength in the three colour channels.

The kernel of the preferred embodiment can be used in conjunction with a plurality of other continuous kernels each optimised for different image features, such as smooth areas, textures, or sharp edged. As already described the modified cubic kernel disclosed is particularly advantageous when interpolating sharp edges. Therefore, a scheme that uses the conventional cubic (b=0, c=0.5) in smooth image areas, eg. when the image gradient is below a predetermined threshold, and the modified cubic kernel disclosed in the current invention would offer good performance.

Preferred Embodiment of Apparatus(s)

Figure 11:
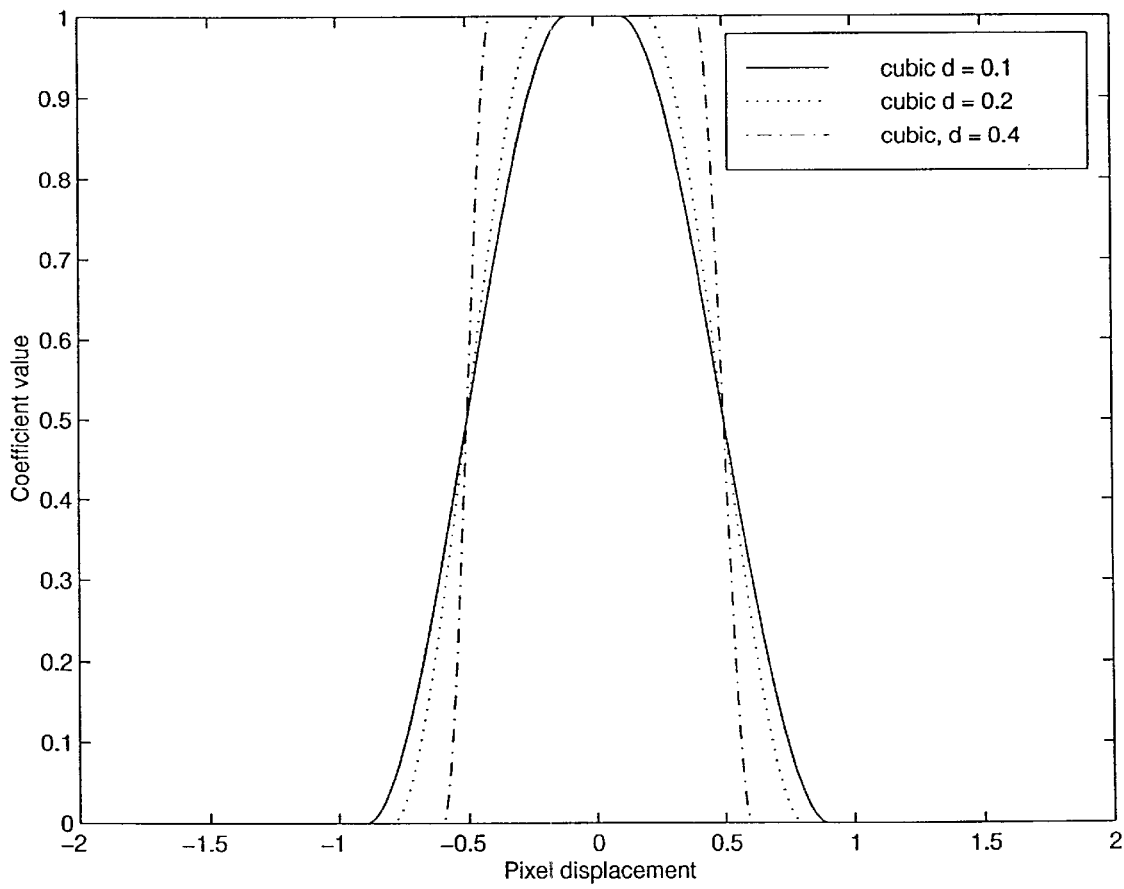
FIG. 11 shows a linear transform of a modified cubic kernel with various values of d in accordance with the present invention.
Figure 12:
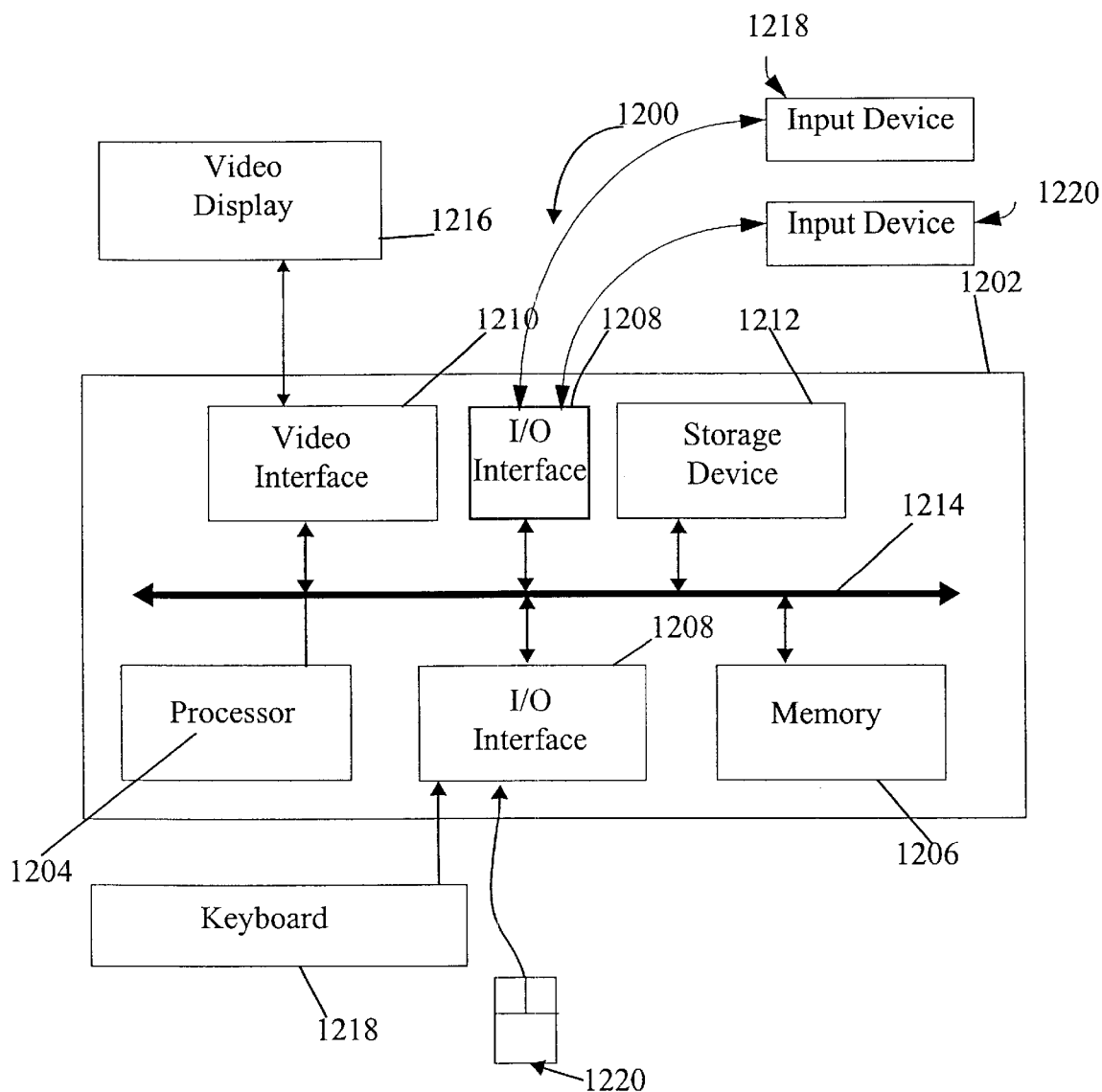
FIG. 12 shows a general purpose computer upon which the method of the preferred embodiment can be practised.

The preferred method is preferably practiced using a conventional general-purpose computer system, such as the system 1200 shown in FIG. 12, wherein the process of FIGS. 9 to 11 can be implemented as software executing on the computer. In particular, the steps of the method are effected by instructions in the software that are carried out by the computer. The software can be divided into two separate parts; one part for carrying out the method of the preferred embodiment; and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for orientating a character stroke or n-dimensional finite space curves in accordance with the embodiments of the invention.

The computer system 1200 has a computer module 1202, a video display 1216, and input devices 1218, 1220. In addition, the computer system 1200 can have any of a number of other output devices including line printers, laser printers, plotters, and other reproduction devices connected to the computer module 1202. The computer system 1200 can be connected to one or more other computers via a communication interface 1208c using an appropriate communication channel 1230 such as a modem communications path, a computer network, or the like. The computer network can include a local area network (LAN), a wide area network (WAN), an Intranet, and/or the Internet The computer module 1202 has a central processing unit(s) (simply referred to as a processor hereinafter) 1204, a memory 1206 which can include random access memory (RAM) and read-only memory (ROM), input/output (IO) interfaces 1208, a video interface 1210, and one or more storage devices generally represented by a block 1212 in FIG. 12. The storage device(s) 1212 can include of one or more of the following: a floppy disc, a hard disc drive, a magneto-optical disc drive, CD-ROM, magnetic tape or any other of a number of non-volatile storage devices well known to those skilled in the art. Each of the components 1204 to 1212 is typically connected to one or more of the other devices via a bus 1214 that in turn has data, address, and control buses.

The video interface 1210 is connected to the video display 1216 and provides video signals from the computer 1202 for display on the video display 1216. User input to operate the computer 1202 can be provided by one or more input devices 1208. For example, an operator can use the keyboard 1218 and/or a pointing device such as the mouse 1220 to provide input to the computer 1202.

The system 1200 is simply provided for illustrative purposes and other configurations can be employed without departing from the scope and spirit of the invention. Exemplary computers on which the embodiment can be practiced include the IBM-PC/ATs or compatibles, one of the Macintosh™ family of PCs, Sun Sparcstation™, arrangements evolved therefrom. The foregoing are merely exemplary of the types of computers with which the embodiments of the invention can be practiced. Typically, the processes of the embodiments, described hereinafter, are resident as software or a program recorded on a hard disk drive (generally depicted as block 1212 in FIG. 12) as the computer readable medium, and read and controlled using the processor 1204. Intermediate storage of the program and pixel data and any data fetched from the network can be accomplished using the semiconductor memory 1206, possibly in concert with the hard disk drive 1212.

In some instances, the program can be supplied to the user encoded on a CD-ROM or a floppy disk (both generally depicted by block 1212), or alternatively could be read by the user from the network via a modem device connected to the computer, for example. Still further, the software can also be loaded into the computer system 1200 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums can be practiced without departing from the scope and spirit of the invention.

The preferred method can alternatively be implemented in dedicated hardware such as one or more integrated circuits performing the functions or sub functions of the steps of the method. Such dedicated hardware can include graphic processors, digital signal processors, or one or more microprocessors and associated memories.

The foregoing only describes one embodiment of the present invention, however, modifications and/or changes can be made thereto by a person skilled in the art without departing from the scope and spirit of the invention.

What is claimed is:

1. A method of providing a representation of image data, the method comprising the following steps:
   (i) accessing a plurality of discrete sample values of said image data;
   (ii) calculating kernel values for each of said discrete sample values using a modified continuous kernel, said modified continuous kernel being constructed by shifting and scaling a continuous kernel, said continuous kernel being scaled from a first range to a second range, said second range being less than said first range, wherein said modified continuous kernel has a substantially symmetrical dead-zone at both an upper end and a lower end of said modified continuous kernel; and
   (iii) convolving said kernel values with said discrete sample values to provide a representation of said image data.

2. The method of according to claim 1, wherein said continuous kernel is of the form:

$$h(s) = \begin{cases} 2|s|^3 - 3|s|^2 + 1, & |s| \leq 1 \\ 0, & \text{Otherwise} \end{cases}$$

and wherein s=t/Δt.

3. The method according to claim 1, wherein said modified continuous kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein s=tΔt and 0≦d<0.5.

4. The method according to claim 2, wherein said first range is s=[0,1] and said second range is s=[d, 1−d].

5. The method according to claim 1, wherein said image data is a portion of a sequence of image data signals.

6. The method according to claim 5, wherein a temporal difference between a previous image data signal and a current image data signal is calculated.

7. The method according to claim 3, wherein parameter d is varied according to a temporal difference between a previous image data signal and a current image data signal.

8. The method according to claim 3, wherein parameter d is varied according to a sampling ratio.

9. The method according to claim 3, wherein parameter d is varied according to edge proximity.

10. The method according to claim 1, wherein said continuous kernel is a linear kernel.

11. The method according to claim 1, wherein said continuous kernel is a quadratic kernel.

12. The method according to claim 1, wherein said continuous kernel is a weighted sinc kernel.

13. An apparatus for providing a representation of image data, the apparatus comprising:
   accessing means for accessing a plurality of discrete sample values of said image data;
   calculating means for calculating kernel values for each of said discrete sample values using a modified continuous kernel, said modified continuous kernel being constructed by shifting and scaling a continuous kernel, said continuous kernel being scaled from a first range to a second range, said second range being less than said first range, wherein said modified continuous kernel has a substantially symmetrical dead-zone at both an upper end and a lower end of said modified continuous kernel; and convolving means for convolving said kernel values with said discrete sample values to provide a representation of said image data.

14. The apparatus according to claim 13, wherein said continuous kernel is of the form:

$$h(s) = \begin{cases} 2|s|^3 - 3|s|^2 + 1, & |s| \leq 1 \\ 0, & \text{Otherwise} \end{cases}$$

and wherein $s=t/\Delta t$.

15. The apparatus according to claim 13, whereon said modified continuous kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein $s=t/\Delta t$ and $0 \leq d < 0.5$.

16. The apparatus according to claim 14, wherein said first range is s=[0,1] and said second range is s=[d, 1−d].

17. The apparatus according to claim 13, wherein said image data is a portion of a sequence of image data signals.

18. The apparatus according to claim 17, wherein a temporal difference between a previous image data signal and a current image data signal is calculated.

19. The apparatus according to claim 15, wherein parameter d is varied according to a temporal difference between a previous image data current image data signal.

20. The apparatus according to claim 15, wherein parameter d is varied according to a sampling ratio.

21. The apparatus according to claim 15, wherein parameter d is varied according to edge proximity.

22. The apparatus according to claim 13, wherein said continuous kernel is a linear kernel.

23. The apparatus according to claim 13, wherein said continuous kernel is a quadratic kernel.

24. The apparatus according to claim 13, wherein said continuous kernel is a weighted sinc kernel.

25. A computer readable medium storing a program for an apparatus which processes data, said processing comprising a method of providing a representation of image data, said program comprising:

code for accessing a plurality of discrete sample values of said image data;

code for calculating kernel values for each of said discrete sample values using a modified continuous kernel, said modified continuous kernel being constructed by shifting and scaling a continuous kernel, said continuous kernel being scaled from a first range to a second range, said second range being less than said first range, wherein said modified continuous kernel has a substantially symmetrical dead-zone at both an upper end and a lower end of said modified continuous kernel; and code for convolving said kernel values with said discrete sample values to provide a representation of said image data.

26. The computer readable medium of according to claim 25, wherein said continuous kernel is of the form:

$$h(s) = \begin{cases} 2|s|^3 - 3|s|^2 + 1, & |s| \leq 1 \\ 0, & \text{Otherwise} \end{cases}$$

and wherein $s=t/\Delta t$.

27. The computer readable medium according to claim 25, wherein said modified continuous kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein $s=t/\Delta t$ and $0 \leq d < 0.5$.

28. The computer readable medium according to claim 26, wherein said first range is s=[0,1] and said second range is s=[d, 1−d].

29. The computer readable medium according to claim 25, wherein said image data is a portion of a sequence of image data signals.

30. The computer readable medium according to any claim 29, wherein a temporal difference between a previous image data signal and a current image data signal is calculated.

31. The computer readable medium according to claim 27, wherein parameter d is varied according to a temporal difference between a previous image data signal and a current image data signal.

32. The computer readable medium according to claim 27, wherein parameter is varied according to a sampling ratio.

33. The computer readable medium according to claim 27, wherein parameter d is varied according to edge proximity.

34. The computer readable medium according to claim 25, wherein said continuous kernel is a linear kernel.

35. The computer readable medium according to claim 25, wherein said continuous kernel is a quadratic kernel.

36. The computer readable medium according to claim 25, wherein said continuous kernel is a weighted sinc kernel.

37. A method of representing image data, the method comprising the following steps:

(i) accessing a plurality of discrete sample values of said image data;

(ii) calculating kernel values for each of said discrete sample values using a scaled kernel, wherein said scaled kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein $s=t/\Delta t$ and $0 \leq d < 0.5$; and (iii) convolving said kernel values with said discrete sample values to provide a representation of said image data.

38. The method according to claim 37, wherein said scaled kernel is generated by transforming a kernel from a first range to a second range, and wherein said second range is less than said first range.

39. The method of according to claim 38, wherein said kernel is of the form:

$$h(s) = \begin{cases} 2|s|^3 - 3|s|^2 + 1, & |s| \le 1 \\ 0, & \text{Otherwise} \end{cases}$$

and wherein s=t/Δt.

40. The method according to claim 38, wherein said first range is s=[0,1] and said second range is s=[d, 1−d].

41. An apparatus for representing image data, the apparatus comprising:

accessing means for accessing a plurality of discrete sample values of said image data;

calculating means for calculating kernel values for each of said discrete sample values using a scaled kernel, wherein said scaled kernel is of the form:

$$h(s) = \begin{cases} 1, & -d < s \le d \\ 0, & -(1-d) \ge s > (1-d) \\ 2\left|\dfrac{s-d}{1-2d}\right|^3 - 3\left|\dfrac{s-d}{1-2d}\right|^2 + 1, & \text{otherwise} \end{cases}$$

and wherein s=t/Δt and 0≦d<0.5; and convolving means for convolving said kernel values with said discrete sample values to provide a representation of said image data.

42. The apparatus according to claim 41, wherein said scaled kernel is generated by transforming a kernel from a first range to a second range, and said second range is less than said first range.

43. The apparatus according to claim 42, wherein said kernel is of the form:

$$h(s) = \begin{cases} 2|s|^3 - 3|s|^2 + 1, & |s| \le 1 \\ 0, & \text{Otherwise} \end{cases}$$

and wherein s=t/Δt.

44. The apparatus according to claim 42, wherein said first range is s=[0,1] and said second range is s=[d, 1−d].

45. A computer readable medium storing a program for an apparatus which processes data, said processing comprising a method of representing image data, said program comprising:

code for accessing a plurality of discrete sample values of said image data;

code for calculating kernel values for each of said discrete sample values using a scaled kernel, wherein said scaled kernel is of the form:

$$h(s) = \begin{cases} 1, & -d < s \le d \\ 0, & -(1-d) \ge s > (1-d) \\ 2\left|\dfrac{2-d}{1-2d}\right|^3 - 3\left|\dfrac{s-d}{1-2d}\right|^2 + 1, & \text{otherwise} \end{cases}$$

and wherein s=t/Δt and 0≦d<0.5; and code for convolving said kernel values with said discrete sample values to provide a representation of said image data.

46. The computer readable medium according to claim 45, wherein said scaled kernel is generated by transforming a kernel from a first range to a second range, and wherein said second range is less than said first range.

47. The computer readable medium according to claim 46, wherein said kernel is of the form:

$$h(s) = \begin{cases} 2|s|^3 - 3|s|^2 + 1, & |s| \le 1 \\ 0, & \text{Otherwise} \end{cases}$$

and wherein s=t/Δt.

48. The computer readable medium according to claim 46, wherein said first range is s=[0,1] and said second range is s=[d, 1−d].

49. A method of transforming a kernel for image processing, the method comprising the following steps:

(i) accessing a continuous kernel for image processing;

(ii) shifting and scaling said continuous kernel from a first range to a second range to produce a modified continuous kernel, said second range being less than said first range, wherein said modified continuous kernel has a substantially symmetrical dead-zone at both an upper end and a lower end of said modified continuous kernel; and (iii) storing said modified continuous kernel.

50. The method according to claim 49, wherein said continuous kernel is of the form:

$$h(s) = \begin{cases} 2|s|^3 - 3|s|^2 + 1, & |s| \le 1 \\ 0, & \text{Otherwise} \end{cases}$$

and wherein s=t/Δt.

51. The method according to claim 49, wherein said modified continuous kernel is of the form:

$$h(s) = \begin{cases} 1, & -d < s \le d \\ 0, & -(1-d) \ge s > (1-d) \\ 2\left|\dfrac{s-d}{1-2d}\right|^3 - 3\left|\dfrac{s-d}{1-2d}\right|^2 + 1, & \text{otherwise} \end{cases}$$

and wherein s=t/Δt and 0≦d<0.5.

52. The method according to claim 49, wherein said first range is s=[0,1] and said second range is s=[d, 1−d].

53. The method according to claim 51, wherein parameter d is varied according to a temporal difference between a previous image data signal and current image data signal.

54. The method according to claim 51, wherein varied according to a sampling ratio.

55. The method according to claim 51, wherein parameter d is varied according to edge proximity.

56. The method according to claim 49, wherein the continuous kernel is a linear kernel.

57. The method according to claim 49, wherein the continuous kernel is a quadratic kernel.

58. The method according to claim 49, wherein the continuous kernel is a weighted sinc kernel.

59. An apparatus for transforming a kernel for image processing, said apparatus comprising:

accessing means for accessing a continuous kernel for image processing;

transforming means for shifting and scaling said continuous kernel from a first range to a second range to produce a modified continuous kernel, said second range being less than said first range, wherein said modified continuous kernel has a substantially symmetrical dead-zone at both an upper end and a lower end of said modified continuous kernel; and storing means for storing said modified continuous kernel.

60. The apparatus according to claim 59, wherein said continuous kernel is of the form:

$$h(s) = \begin{cases} 2|s|^3 - 3|s|^2 + 1, & |s| \leq 1 \\ 0, & \text{Otherwise} \end{cases}$$

and wherein s=t/Δt.

61. The apparatus according to claim 59, wherein said modified kernel is of the form:

$$h(s) = \begin{cases} 1, & -d < s \leq d \\ 0, & -(1-d) \geq s > (1-d) \\ 2\left|\frac{2-d}{1-2d}\right|^3 - 3\left|\frac{s-d}{1-2d}\right|^2 + 1, & \text{otherwise} \end{cases}$$

and wherein s=t Δt and 0≦d<0.5.

62. The apparatus according to claim 59, wherein said first range is s=[0,1] and said second range is s=[d, 1−d].

63. The apparatus according to claim 61, wherein parameter d is varied according to a temporal difference between a previous image data signal and a current image data signal.

64. The apparatus according to claim 61, wherein parameter d is varied according to a sampling ratio.

65. The apparatus according to claim 61, wherein parameter d is varied according to edge proximity.

66. The apparatus according to claim 59, wherein the continuous kernel is a linear kernel.

67. The apparatus according to claim 59, wherein the continuous kernel is a quadratic kernel.

68. The apparatus according to claim 59, wherein the continuous kernel is a weighted sinc kernel.

69. A computer readable medium storing a program for an apparatus which processes data, said processing comprising a method of transforming a kernel for image processing, said program comprising:

code for accessing a continuous kernel for image processing;

code for shifting and scaling said continuous kernel from a first range to a second range to produce a modified continuous kernel, said second range being less than said first range, wherein said modified continuous kernel has a substantially symmetrical dead-zone at both an upper end and a lower end of said modified continuous kernel; and code for storing said modified continuous kernel.

70. The computer readable medium according to claim 69, wherein said continuous kernel is of the form:

$$h(s) = \begin{cases} 2|s|^3 - 3|s|^2 + 1, & |s| \leq 1 \\ 0, & \text{Otherwise} \end{cases}$$

and wherein s=t/Δt.

71. The computer readable medium according to claim 69, wherein said modified continuous kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein s=t/Δt and 0≦d<0.5.

72. The computer readable medium according to claim 69, wherein said first range is s=[0,1] and said second range is s=[d, 1−d].

73. The computer readable medium according to claim 71, wherein parameter d is varied according to a temporal difference between a previous image data signal and a current image data signal.

74. The computer readable medium according to claim 71, herein parameter d is varied according to a sampling ratio.

75. The computer readable medium according to claim 71, wherein parameter d is varied according to edge proximity.

76. The computer readable medium according to claim 69, wherein the continuous kernel is a linear kernel.

77. The computer readable medium according to claim 69, wherein the continuous kernel is a quadratic kernel.

78. The computer readable medium according to claim 69, wherein the continuous kernel is a weighted sinc kernel.

79. A method of converting a first set of discrete data sample values of an image having a first sample rate to a second set of discrete data sample values of said image having a second sample rate, the method comprising the following steps:

(i) accessing said first set of data sample values; and (ii) performing the following operations for each data value of said second set;

(a) calculating kernel values for each of said discrete sample values of said first set, according to a modified continuous kernel, wherein said modified continuous kernel is constructed from a shifted and scaled version of a second kernel, wherein said modified continuous kernel has a substantially symmetrical dead-zone at both an upper end and a lower end of said modified continuous kernel; and (b) convolving said kernel values with said discrete sample values of said first data set to provide a current data value of said second set.

80. The method of according to claim 79, wherein said second kernel is of the form:

$$h(s) = \begin{cases} 2|s|^3 - 3|s|^2 + 1, & |s| \leq 1 \\ 0, & \text{Otherwise} \end{cases},$$

and wherein s=t/Δt.

81. The method according to claim 79, wherein said modified continuous kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein s=t/Δ≦d<0.5.

82. The method according to claim 79, wherein said image is sampled to generate said first set of discrete data sample values.

83. The method according to claim 81, wherein parameter d is varied according to a temporal difference between a previous image data signal and a current image data signal.

84. The method according to claim 81, wherein parameter d is varied according to a sampling ratio.

85. The method according to claim 81, wherein parameter d is varied according to edge proximity.

86. The method according to claim 79, wherein the second kernel is a linear kernel.

87. The method according to claim 79, wherein the second kernel is a quadratic kernel.

88. The method according to claim 79, wherein the second kernel is a weighted sinc kernel.

89. An apparatus for converting a first set of discrete data sample values of an image having a first sample rate to a second set of discrete data sample values of said image having a second sample rate, the apparatus comprising:
- access means for accessing said first set of data sample values; and
- processing means for performing the following operations for each data value of said second set;
  - (a) calculating kernel values for each of said discrete sample value of said first set, according to a modified continuous kernel, wherein said modified continuous kernel is constructed from a shifted and scaled version of a second kernel, wherein said modified continuous kernel has a substantially symmetrical dead-zone at both an upper end and a lower end of said modified continuous kernel; and
  - (b) convolving said kernel values with said discrete sample values of said first data set to provide a current data value of said second set.

90. The apparatus according to claim 89, wherein said second kernel is of the form:

$$h(s) = \begin{cases} 2|s|^3 - 3|s|^2 + 1, & |s| \leq 1 \\ 0, & \text{Otherwise} \end{cases},$$

and wherein $s=t/\Delta t$.

91. The apparatus according to claim 89, wherein said modified continuous kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein $s=t/\Delta t$ and $0 \leq d < 0.5$.

92. The apparatus according to claim 89, wherein said image is sampled to generate said first set of discrete data sample values.

93. The apparatus according to claim 91, wherein parameter d is varied according to a temporal difference between a previous image data signal and a current image data signal.

94. The apparatus according to claim 91, wherein parameter d is varied according to a sampling ratio.

95. The apparatus according to claim 91, wherein parameter d is varied according to edge proximity.

96. The apparatus according to claim 89, wherein the second kernel is a linear kernel.

97. The apparatus according to claim 89, wherein the second kernel is a quadratic kernel.

98. The apparatus according to claim 89, wherein the second kernel a weighted sinc kernel.

99. A computer readable medium storing a program for an apparatus which processes data, said processing comprising a method of converting a first set of discrete data sample values of an image having a first sample rate to a second set of discrete data sample values of said image having a second sample rate, said program comprising:
- code for accessing said first set of data sample values; and
- code for performing the following operations for each data value of said second set;
  - (a) calculating kernel values for each of said discrete sample values of said first set, according to a modified continuous kernel, wherein said modified continuous kernel is constructed from a shifted and scaled version of a second kernel, wherein said modified continuous kernel has a substantially symmetrical dead-zone at both an upper end and a lower end of said modified continuous kernel; and
  - (b) convolving said kernel values with said discrete sample values of said first data set to provide a current data value of said second set.

100. The computer readable medium of according to claim 99, wherein said second kernel is of the form:

$$h(s) = \begin{cases} 2|s|^3 - 3|s|^2 + 1, & |s| \leq 1 \\ 0, & \text{Otherwise} \end{cases},$$

and wherein $s=t/\Delta t$.

101. The computer readable medium according to claim 99, wherein said modified continuous kernel is of the form:

$$h(s) = \begin{cases} 1, & -d < s \leq d \\ 0, & -(1-d) \geq s > (1-d) \\ 2\left|\frac{s-d}{1-2d}\right|^3 - 3\left|\frac{s-d}{1-2d}\right|^2 + 1, & \text{otherwise} \end{cases}$$

and wherein $s=t/\Delta t$ and $0 \leq d < 0.5$.

102. The computer readable medium according to claim 99, wherein said image is sampled to generate said first set of discrete data sample values.

103. The computer readable medium according to claim 101, wherein parameter d is varied according to a temporal difference between a previous image data signal and a current image data signal.

104. The computer readable medium according to claim 101, wherein parameter d is varied according to a sampling ratio.

105. The computer readable medium according to claim 101, wherein parameter d is varied according to edge proximity.

106. The computer readable medium according to claim 99, wherein the second kernel is a linear kernel.

107. The computer readable medium according to claim 99, wherein the second kernel a quadratic kernel.

108. The computer readable medium according to claim 99, wherein the second kernel is a weighted sinc kernel.

* * * * *

UNITED STATES PATENT AND TRADEMARK OFFICE
CERTIFICATE OF CORRECTION

PATENT NO.      : 6,687,417 B1
DATED           : February 3, 2004
INVENTOR(S)     : Andrew Peter Bradley et al.

It is certified that error appears in the above-identified patent and that said Letters Patent is hereby corrected as shown below:

Column 1,
Line 59, " $\left(\dfrac{1}{6}b\right)$ " should read -- $\left(-\dfrac{1}{6}b\right)$ --.

Column 3,
Lines 7 and 27, "1" shoud read -- 1, --;
Line 54, "otherwise" should be deleted.

Column 6,
Line 8, "otherwise" should be deleted.

Column 10,
Line 37, "s=t$\Delta$t" should read -- s=t/$\Delta$t --.

Column 11,
Line 16, "whereon" should read -- wherein --;
Line 35, "data" (first occurrence) should read -- data signal and a --; and
Line 66, "of" should be deleted.

Column 13,
Line 54, "2-d" should read -- s-d --.

Column 14,
Line 44, "wherein" should read -- wherein parameter d is --.

Column 15,
Line 12, "2-d" should read -- s-d --; and
Line 15, "s=t$\Delta$t" should read -- s=t/$\Delta$t --.

UNITED STATES PATENT AND TRADEMARK OFFICE
CERTIFICATE OF CORRECTION

PATENT NO.     : 6,687,417 B1
DATED          : February 3, 2004
INVENTOR(S)    : Andrew Peter Bradley et al.

It is certified that error appears in the above-identified patent and that said Letters Patent is hereby corrected as shown below:

Column 16,
Line 4, "herein" should read -- wherein --.

Signed and Sealed this

Twenty-first Day of February, 2006

JON W. DUDAS
*Director of the United States Patent and Trademark Office*